United States Patent [19]

Kahn et al.

[11] 4,028,329

[45] June 7, 1977

[54] PROCESS FOR THE BULK POLYMERIZATION OF VINYL HALIDE POLYMERS SHOWING REDUCED REACTOR SCALE FORMATION

[75] Inventors: Henry Kahn, Williamsville; William L. Schall, Grand Island, both of N.Y.

[73] Assignee: Hooker Chemicals & Plastics Corporation, Niagara Falls, N.Y.

[22] Filed: July 24, 1974

[21] Appl. No.: 491,189

[52] U.S. Cl. .................. 260/42.53; 260/29.6 WQ; 260/878 R; 260/884
[51] Int. Cl.$^2$ ........................................ C08K 3/36
[58] Field of Search .......... 260/92.8 R, 884, 878 R, 260/29.6 WQ, 42.53

[56] References Cited

UNITED STATES PATENTS

| | | | |
|---|---|---|---|
| 3,151,103 | 9/1964 | Heckmaier | 260/92.8 R |
| 3,558,584 | 10/1966 | Thomas | 260/92.8 |
| 3,562,237 | 11/1964 | Thomas | 260/92.8 |
| 3,683,051 | 8/1972 | Chatelain | 260/878 R |
| 3,692,816 | 9/1972 | della Faille | 260/46.5 R |
| 3,816,565 | 6/1974 | Takahashi | 260/884 |
| 3,855,162 | 12/1974 | Durand | 260/29.6 WQ |

FOREIGN PATENTS OR APPLICATIONS 1,291,327  10/1972  United Kingdom

*Primary Examiner*—Paul R. Michl
*Attorney, Agent, or Firm*—Peter F. Casella; James F. Mudd; David A. Stein

[57] ABSTRACT

An improved bulk polymerization of vinyl halide is disclosed wherein reactor scale formation is substantially reduced by polymerizing in a single or two stage bulk process a vinyl halide monomer containing up to 50% of a comonomer in contact with a combination of a polyolefin, water, and an inert fine particle size additive which is a solid at the reaction temperature, or water and said additive, optionally in the presence of a surface active agent. Compositions produced by the process of the invention are useful in making films, coated fabrics and molded objects.

14 Claims, No Drawings

4,028,329

PROCESS FOR THE BULK POLYMERIZATION OF VINYL HALIDE POLYMERS SHOWING REDUCED REACTOR SCALE FORMATION

BACKGROUND OF THE INVENTION

1. Field of the Invention

This invention relates to a process for the preparation of homopolymers and copolymers of a vinyl halide such as vinyl chloride characterized by reduced reactor scale formation. The reactor scale formed in a commercial process of bulk polymerization occurs to such an extent that it is normally required that the reactor and stirring blades be cleaned subsequent to the preparation of each batch of vinyl halide polymer. The production of reactor scale is normally much greater where high temperatures of polymerization are used to produce low molecular weight bulk polymerized polymers. The tenacity of adhesion of the scale to the reactor walls and stirring mechanism varies, but generally where the polymer scale has fused to the wall or stirring mechanism as the result of the use of high polymerization temperatures it is extremely difficult to remove such scale by mechanical means.

2. Description of the Prior Art

U.S. Pat. No. 3,725,367 to Kemp relates to the preparation of vinyl based polymers and copolymers in a single stage bulk process of polymerization in which a seeding latex of polyvinyl chloride is present during the polymerization process. Within the particles of the seeding latex there is contained a quantity of catalyst or initiator which permits initiation of the bulk polymerization process without separate addition of initiator.

It is noted that a particularly small amount of encrustation (scale) forms on the walls of the reactor during the polymerization process.

U.S. Pat. No. 3,642,745 relates to the polymerization of vinyl chloride in an aqueous medium in the absence of a dispersing agent and in the presence of a dispersion of a granular inert solid such as silica. Crusting on the polymerization reactor wall is avoided by the process.

U.S. Pat. No. 3,488,328 relates to the suspension polymerization of vinyl chloride in the presence of a suspending agent, a non-ionic surface active agent, and an organic solvent inert to the polymerization reaction so as to prevent adhesion of polymer scale to the inner wall of the polymerization vessel.

In view of these prior art references, it is surprising that a process for the bulk polymerization of a vinyl halide in contact with a small amount of water and an inert inorganic fine particle size additive such as silica would result in a reduction in the amount of reactor scale formed during the process.

SUMMARY OF THE INVENTION

This invention relates to a method for reducing the formation of reactor scale in a bulk process of polymerization of a vinyl halide. The bulk polymerization process can be a single stage or a two stage process. Reduction in reactor scale is accomplished by polymerization in contact with an inert fine particle size additive solid at least at reaction temperature either alone or in combination with a surface active agent and at least one of (1) a polyolefin and water or (2) water alone.

It has been found that polymerization of a vinyl halide in contact with a combination of said inert fine particle size additive and water provides a synergistic reduction in the amount of reactor scale produced during the polymerization process.

In order to provide an extender resin suitable for use in plastisols additional steps in the process can involve the post-addition of the same or a different monomer, and the use of a higher polymerization temperature in a portion of the second stage in order to provide non-porous granules of polyvinyl halide. Where it is desired to provide polyvinyl halide molding compounds having high impact strength, the bulk polymerization can be accomplished (1) in a single stage or two stages utilizing the addition of a monomer different than used initially during a portion of the polymerization process or (2) with the use of a vinyl halide polymer seed to which a monomer is added during bulk polymerization and wherein the monomer added is different from the monomer used to prepare the vinyl halide polymer seed.

DESCRIPTION OF THE PREFERRED EMBODIMENTS

The preferred method of the invention contemplates bulk polymerization of vinyl halide in contact with an inert fine particle size additive solid at least at reaction temperature either alone or in combination with a surface active agent and at least one of a mixture of a polyolefin and water, or water alone in order to reduce the formation of reactor scale on the inner sides of the polymerization vessel and on the stirring mechanism.

In one aspect of the invention, there is contemplated the addition of at least one monomer which is different from that used to prepare said base polymer which functions as a seed particle, followed by post polymerization of said monomer so as to provide a polymer having increased bulk density, reduced plasticizer absorption and, by appropriate selection of additional monomer added during the post polymerization reaction, increased impact strength, reduced melt viscosity and lower glass transition temperature. The additional monomer can be added either all at once or continuously at a stage in a bulk process where conversion of the bulk polymerized base polymer to the powder form has been obtained. This is a conversion of about 30 to about 95 percent. Where the additional monomer or monomers are added continuously, the rate of addition is adjusted so as to provide for completion of addition before the end of the polymerization cycle. Alternately, the additional monomer can be added to a liquid phase bulk polymerized polymer seed and polymerization initiated. The proportion of monomer or monomers added is generally from about 1 to about 200 percent by weight of the resultant converted polymer, preferably from about 2 to about 150 percent by weight on the weight of the resultant converted polymer. Further details of a post polymerization process for vinyl halide can be obtained in copending applications Ser. No. 251,097, filed May 8, 1972, and Ser. No. 465,008, filed Apr. 29, 1974.

A less preferred method of the invention contemplates the addition of at least one monomer to a base polymer produced by a suspension or emulsion polymerization process. A polymer product is obtained having increased bulk density, lower glass transition temperature, reduced melt viscosity and improved impact strength. The polymers produced by the process of the invention can have bulk densities of about 0.3 grams per milliliter to about 0.9 grams per milliliter and impact strengths of about 2 to about 30 foot pounds per inch of notch.

In the method of the invention wherein seed particles of a vinyl halide polymer produced by emulsion, suspension or liquid phase bulk polymerization processes are used, the additional monomer is added to the seed particles in powder form and a liquid bulk polymerization process is initiated. In a preferred aspect of the process wherein an integrated bulk polymerization process is obtained, the vinyl halide monomer can be polymerized in either a single stage or a two-stage process of bulk polymerization until a monomer conversion of between about 30 percent to about 95 percent is achieved and subsequently the additional monomer which may be the same as the vinyl halide monomer used initially or alternately a different monomer may be added.

The preferred two-stage bulk polymerization process used in the invention is disclosed in British Pat. No. 1,047,489 and U.S. Pat. No. 3,522,227, both of which are incorporated herein by reference.

The vinyl halide monomers included within the scope of the invention include, e.g., vinyl fluoride, vinyl chloride, vinyl bromide, vinyl iodide, vinylidene fluoride, vinylidene chloride, vinylidene bromide, vinylidene iodide and the like, although vinyl chloride is preferred. It is intended to include within the scope of the invention all alpha-halo-substituted ethylenically unsaturated compounds which are capable of entering into an addition polymerization reaction. The polymers of the present invention can be formed of the same or different alpha-halo-substituted ethylenically unsaturated materials and, thus, the invention is intended to cover homopolymers, copolymers, terpolymers and tetrapolymers formed by addition polymerization. Illustrative of these copolymers is a copolymer of vinyl chloride and vinylidene chloride. The term "vinyl halide polymer" as used in this specification and claims is intended to include both vinyl halide homopolymers and copolymers prepared using a vinyl halide and ethylenically unsaturated monomers copolymerizable therewith.

While the monomer composition can be comprised totally of vinyl halide monomer, the present invention is also intended to include copolymers formed by the free-radical addition polymerization of a monomer composition containing a predominant amount, e.g., at least 50% of vinyl halide, preferably 80% of a vinyl halide and a minor amount, e.g. up to 50% by weight of another ethylenically unsaturated monomer material copolymerizable therewith. Preferably, the other ethylenically unsaturated monomer material is used in amounts of less than 20% by weight and more preferably in amounts less than 10% by weight of the total monomer compounds used in preparing the polymer. Suitable ethylenically unsaturated monomer materials which can be used to form base copolymers, terpolymers, interpolymers and the like, are illustrated by the following monoolefinic hydrocarbons, i.e., monomers containing only carbon and hydrogen, including such materials as ethylene, propylene, butene-1, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl laurate, vinyl benzoate, vinyl caprate, vinyl hexanoate, vinyl-p-chlorobenzoates, alkyl methacrylates, e.g., methyl, ethyl, propyl and butyl methacrylate; octyl methacrylate, lauryl methacrylate, stearyl methacrylate, alkyl crotonates, e.g., octyl; alkyl acrylates, e.g., methyl, ethyl, propyl, butyl, 2-ethyl hexyl, stearyl, n-hexyl, n-octyl, hydroxyether and tertiary butylamino acrylates, 2-ethoxy ethyl acrylate, 2-methoxy ethyl acrylate, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, methyl alpha-chloroacrylate, and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and alkyl alpha-cyanoacrylates, e.g., methyl alpha-cyanoacrylate and ethyl alpha-cyanoacrylate; itaconates, e.g., monomethyl itaconate, monoethyl itaconate, diethyl itaconate, alcohol (C-3 to C-8) itaconates; maleates, e.g., monomethyl maleate, monoethyl maleate, dimethyl maleate, diethyl maleate, alcohol (C-3 to C-8) maleates; and fumarates, e.g., monomethyl fumarate, mono-ethyl fumarate, dimethyl fumarate, diethyl fumarate, alcohol (C-3 to C-8) fumarates, and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included. Diolefinically unsaturated hydrocarbons containing two olefinic groups in conjugated relation and the halogen derivatives thereof, e.g. butadiene-1,3; 2-methylbutadiene-1,3; 2,3-dimethylbutadiene-1,3; 2-methylbutadiene-1,3; 2,3-dimethylbutadiene-1,3; 2-chlorobutadiene-1,3; 2,3-dichlorobutadiene-1,3; and 2-bromobutadiene-1,3 and the like.

Specific monomer compositions for forming the base copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrated of the numerous combinations of monomers possible for the formation of copolymers. The present invention is intended to cover all such combinations which fall within the scope of the present invention. While such combinations are intended to be included within the scope of the present invention, it is preferred that the base polymer be formed from vinyl halide monomer alone and most preferably vinyl chloride.

The monomer or monomers added subsequent to the partial conversion of monomer or monomers can be the same or different than the vinyl halide polymer used to form the base polymer and where different the monomer or monomers are preferably selected from those classes of monomers which polymerize at the same or a faster rate as compared to said vinyl halide polymer. Examples of monomers useful in the post polymerization process of the invention are those listed above. Where impact strength is desired in the product of the process, monomers are used such as 1-olefins of 2 to 10 carbon atoms, e.g., ethylene, propylene, pentene-1, butene-1, octene-1, decene-1; vinyl esters such as vinyl butyrate, vinyl stearate, vinyl laurate, vinyl caprate, vinyl hexanoate; alkyl methacrylates such as octyl methacrylate; alkyl acrylates such as ethyl acrylate, propyl acrylate, butyl acrylate, 2-ethyl hexyl acrylate, stearyl acrylate, n-hexyl acrylate, n-octyl acrylate; hydroxyether acrylates such as 2-methoxy ethyl acrylate, 2-ethoxy ethyl acrylate; maleates, fumarates and itaconates such as monoethyl maleate, monoethyl maleate, dimethyl maleate, diethyl maleate, monomethyl itaconate, monoethyl itaconate, dimethyl itaconate, diethyl itaconate, monoethyl fumarates, monoethyl fumarate, dimethyl fumarate, diether fumarate, alcohol maleates, fumarates and itaconates having an alcohol chain length of C-3 to C-8; vinyl alkyl ethers and vinyl ethers, such as vinyl methyl ether, vinyl ethyl ether, vinyl propyl ether, vinyl n-butyl ether, vinyl isobutyl ether, vinyl 2-ethylhexyl ether, vinyl cetyl ether; di-olefinically unsaturated hydrocarbons containing two olefinic groups in conjugated relation, such as butadiene-1,3; 2-methylbutadiene-1,3; 2,3-dimethylbutadiene-1,3; 2-chlorobutadiene-1,3. Impact strength values for the polymers of the invention are about 2 to about 30 foot pounds per inch at ambient temperature.

Where copolymers having good impact strength at temperatures below ambient temperature as well as impact strength at room temperature are desired to be produced by the process of the invention, a vinyl halide monomer alone or in admixture with other monomers are used to form the base polymer, and the post polymerization process step utilizes a monomer or monomers such as the acrylates which can be polymerized alone to form rubbery homopolymers having glass transition temperatures of 10° C or below. Acrylic acid esters are particularly desirable as monomers for use in providing vinyl halide copolymers having good impact strength. The acrylic acid esters found useful are those which contain about 2 to about 15 carbon atoms in the alkyl group preferably about 2 to about 11 carbon atoms and most preferably about 4 to about 8 carbon atoms. Such monomers are added either all at once or continuously to the bulk polymerization process of the invention when conversion of the base vinyl halide polymer has been obtained of between about 30 to about 95 percent, preferably about 50 to about 95 percent conversion at a time when the base polymer is in the powder form. Preferred acrylic acid ester comonomers for producing polymers having low temperature impact strength are n-butyl acrylate, 2-ethyl hexyl acrylate, n-hexyl acrylate, and n-octyl acrylate.

The free radical bulk polymerization can take place in accordance with the process of the invention at temperatures between about 25° and about 95° centigrade. The polymerization reaction is conducted in the presence of a free radical initiator. Useful free-radical initiators are organic or inorganic peroxides, persulfates, ozonides, hydroperoxides, peracids and percarbonates, azo compounds, diazonium salts, diazotates, peroxy sulfonates, trialkyl borane-oxygen systems, and amine oxides. Azobisisobutyronitrile is particularly useful in the present invention. The catalyst is used in concentrations ranging from about 0.01 to abut 1.0% by weight based on the total weight of the monomers. For use in mass, suspension, and solution polymerization, the catalysts which are soluble in the organic phase, such as benzoyl peroxide, diacetyl peroxide, azobisisobutyronitrile, diisopropyl peroxydicarbonate, azobis (alpha-methyl-gamma-carboxybutyronitrile), 2-methyl pentanoyl peroxide, caprylyl peroxide, lauroyl peroxide, azobisisobutyramidine hydrochloride, t-butyl peroxypivalate, 2,4-dichlorobenzoyl peroxide, azobis (alpha, gamma-dimethyl-valeronitrile), and 2,2'-azobis(2,4-dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking. It is particularly desirable to utilize the initiator without an organic carrier liquid such as dimethyl phthalate which can act as a plasticizer for polyvinyl chloride.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

In the post liquid phase bulk polymerization method of the invention, all other conditions and measures are those conventionally employed in the previously known processes for bulk polymerization of vinyl chloride comprising a two-stage polymerization as disclosed in British Pat. No. 1,047,489 and U.S. Pat. No. 3,522,227. In an integrated post polymerization process of the invention with a two-stage bulk polymerization process for vinyl halide, the reaction is conducted in a first stage reactor with means chosen to agitate the monomer or monomers of a type capable of providing high shear and commonly referred to as a "radial turbine type" agitator. At the start of the first stage reaction, the vessel is charged with a monomer composition to which a catalyst has been added. Any polymerization catalyst generally used in bulk polymerization methods, that is those hereinabove described can be used to an extent which is usual for bulk polymerization processes. After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a second stage polymerization vessel equipped to provide slow speed, low shear agitation so as to insure proper temperature control of the reaction medium.

By the method of the invention, a small particle size polymer can be obtained. The size of the polymer particles is reduced over methods of the prior art by the incorporation of an additive or a surfactant or mixture thereof to the first stage of the bulk polymerization process. Thus, there is incorporated with the monomer or monomers in a first stage polymerization reactor 0.001 percent to 5 percent by weight, based on the monomer or monomers present in the first stage of the vinyl chloride polymerization of an additive to control polymer particle size, said additive having an average particle size in the range of about 0.001 to about 50 microns. A suitable additive is fumed silica sold by Degussa under the tradename "Aerosil". The silica can be treated with an agent to render it hydrophobic. Such a treating agent is dichlorodimethylsilane which is used to produce a fumed silica sold under the tradename "Aerosil R-972" by Degussa. The silica used preferably is a fumed silica having an average particle size below $10^{-1}$ microns.

It is contemplated that both organic and inorganic solid particulate matter which is both insoluble in vinyl chloride monomer and solid at temperatures at least up to reaction temperatures can be used in conjunction with monomers disclosed in the invention in a bulk polymerization process to provide a reduction in particle size of the polymers produced. The average particle size of the solid, inert, particulate matter can be in the range of 0.001 micron to about 50 microns with an average particle size range of 0.01 micron to about 15 microns preferred. An example of an organic solid particulate material useful in the process of the invention is emulsion polymerized vinyl chloride having an average particle size of two microns. Examples of inorganic solid particulate materials other than fumed silica useful in the process of the invention are carbonates such as calcium, magnesium, zinc, cadmium, and barium carbonates, aluminum silicates, and talc. When large quantities of solid inert matter can be added to the monomer without adding excessively to the cost or detracting from the physical properties of the polymers obtained, it is possible to use organic or inorganic solid inert particulate matter having an average particle size range up to 50 microns. An operable amount of useful solid inert particulate matter may thus be obtained from materials having greater than the above preferred average particle size.

The surfactants, or surface active agents, used in combination with vinyl chloride monomer or monomers can be of the nonionic, cationic, or anionic type and present in the range of 0.01 percent to 5 percent by weight based upon the monomer or monomers present in the first stage polymerization.

The surface active agents are agents having structurally unsymmetrical molecules containing both hydrophilic and hydrophobic moieties. The non-ionics do not ionize but may acquire hydrophilic character from an oxygenated side chain, usually polyoxyethylene. The oil-soluble part of the molecule can be aliphatic or aromatic in nature. The cationics ionize so that the oil-soluble portion is positively charged. Principal examples are quaternary ammonium halides such as benzothonium chloride and cetaalkonium chloride. The anionics form negatively charged ions contained in the oil-soluble portion of the molecule. The ionizable group is the hydrophilic portion. Examples are sodium salts of organic acids, such as stearic acid and sulfonates or sulfates such as alkylaryl sulfonates, i.e., sulfonates of dodecylbenzene and sulfates of straight chain primary alcohols either fatty alcohols or products of the Oxo process, i.e., sodium lauryl sulfate. Examples of non-ionic surfactants that have proven effective are octyl-phenoxy polyethoxyethanols sold under the trade name "Triton X-100" and "Triton X-35" by the Rohm & Haas Company, Philadelphia, Pennsylvania. Examples of anionic surfactants are as follows: calcium, zinc, magnesium, and nickel stearates. An example of an effective cationic surfactant is a quaternized amine sold under the trade name "Quaternary O" by the Ciba-Geigy Corporation. Further details of the use of particle size control additives and surfactants can be obtained from copendng application Ser. No. 169,838, filed Aug. 6, 1971, which is incorporated herein by reference.

The polymers produced by the process of the invention are polymerized in contact with an inert fine particle size additive solid at least at reaction temperature either alone or in combination with a surface active agent and (1) a polyolefin and water or (2) water alone to reduce reactor scale. The amount of water to be added either in a single stage bulk polymerization process or in a first stage or second stage or during both stages of a two-stage bulk polymerization process is about 0.02% to about 0.3%, preferably 0.3% to about 0.1%, all based upon total monomer present. The polyolefins used are characterized by being soluble, partially soluble or dispersible at normal room temperature and pressure in vinyl chloride monomer and if a homopolymer having monomeric units with 2 to 8 carbon atoms; if copolymers, having monomeric units with 2 to 8 carbon atoms; and if a halogenated polymer, having monomeric units with 2 to 8 carbon atoms. Suitable halogenated polyolefins are chlorinated, brominated, or fluorinated polyolefins. The weight average molecular weight of the olefin polymers, copolymers and terpolymers can vary from about 50,000 to about 300,000 and higher, up to 1,000,000 and higher, preferably the olefin polymers have an apparent molecular weight as measured by solution viscosity of about 50,000 to about 200,000. The olefin polymer can be liquid or solid as desired and present in the proportion of about 0.05 to about 2.5 percent by weight based upon vinyl halide monomer. Further details of the use of olefin polymers in bulk polymerization processes can be found in copending applications Ser. No. 251,099, filed May 8, 1972, and Ser. No. 427,895, filed Dec. 26, 1973, which are incorporated herein by reference.

The reaction temperature in both first and second stage reactors is generally in the range from about 25° centrigrade to about 95° centrigrade, preferably about 30° to about 80° ccentrigrade. The reaction pressure in the first stage reactor is generally in the range from about 70 pounds per square inch to about 285 pounds per square inch, preferably about 140 to about 190 pounds per square inch and corresponds to and results from the temperature used in the process. The reaction pressure in the second stage reactor is generally from about 70 to about 285 pounds per square inch, preferably from about 90 to about 205 pounds per square inch, and also corresponds to and results from the temperature used in the process.

During the second stage bulk polymerization process, the temperature of the reactor contents can be raised. Said increase in polymerization temperature can be about 10° to about 65° centigrade. The pressure is then correspondingly raised to a maximum of about 285 pounds per square inch in order to initiate the reaction where a higher temperature initiator is added at the beginning of the second stage of a two-stage bulk polymerization reaction process. Further details can be obtained of a process of bulk polymerization in two stages in which the temperature of the reactor contents is raised during the second stage of the process by reference to an earlier filed, commonly owned U.S. application, Ser. No. 379,886, filed July 16, 1973, which is hereby incorporated by reference.

When the post-polymerization step described earlier is conducted at a higher reaction temperature than is used initially in the second stage of the polymerization process, said post-polymerization results in the particles produced being non-porous, being less susceptible to solvation when in contact at room temperature with a primary plasticizer for polyvinyl chloride or polyvinyl chloride copolymers. The polymers also fuse at a lower temperature.

In order to further illustrate this invention but without being limited thereto, the following examples are given. In this specification and claims, all parts and percentages are by weight, all pressures are gauge pressures, and all temperatures are in degrees centigrade unless otherwise specified.

EXAMPLE 1

Control

In a vertical type first stage reactor of 2½ gallon capacity and stainless steel construction, equipped with a radial turbine type agitator were added 9.0 grams of fumed silica treated with dichlorodimethyl silane, 2 ml. Triton X-100, 0.67 ml of a 29 percent solution of acetyl cyclohexane sulfonyl peroxide in dimethyl phthalate sold under the trademark "Lupersol 228P" by the Lucidol Division of the Pennwalt Company and 2.2 ml of a 40 percent solution of di-2, ethylhexyl peroxy dicarbonate in mineral spirits sold under the trademark "Lupersol 223M" by the Ludicol Division of the Pennwalt Company. 11.0 pounds of vinyl chloride were added to the reactor at a temperature of 20° centigrade and 1.0 pounds of the vinyl chloride monomer were vented to the atmosphere to remove air from the reactor. The mixture in the reactor was slowly raised in temperature while agitating using the radial turbine type agitator at a speed of 2,000 revolutions per minute to a temperature of 67 degrees centigrade over a period of 1 hour and maintained at this temperature for a period of 15 minutes at a reaction pressure of 167 pounds per square inch.

The mixture was then transferred to a 5-gallon stainless steel second stage reaction vessel containing 5.5 ml. of "Lupersol 228P", 5.5 g. lauroyl peroxide and 6 pounds of vinyl chloride. In order to clear the air from the reactor 1.0 pounds of vinyl chloride were vented. The mixture was heated to 50° l centigrade and the pressure raised to 97 pounds per square inch. These conditions were maintained over a period of 4.0 hours.

Ten pounds of vinyl chloride were added and then the mixture was heated further and a pressure of 175 psi was maintained for 3.0 hours. The monomer that has not reacted is blown off and collected in a condensing circuit incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way, a powdery polymer is obtained in a conversion of 19.6 pounds of polymer. The polymer has an average particle size of 53 microns as indicated by Coulter Counter measurements. The proportion of scale was about 10% of total conversion.

The amount of scale is determined by scraping out the inside of the reactor and stirring blades and weighing the resin obtained. Generally, the amount of scale produced in the bulk process increases as conversion occurs beyond the paste stage (about 30% conversion).

EXAMPLE 2

(Control)

The procedure and proportions of ingredients of Example 1 was repeated except that the acetyl cyclohexane sulfonyl peroxide and dimethyl phthalate was eliminated from the formulation and 2-methylpentanoyl peroxide was used instead. The level of scale was decreased by more than 50% to about 5% scale expressed as a proportion of total conversion and the reactor was easy to clean. In addition, there was almost no fusion of the scale.

EXAMPLE 3

Using the same procedure, equipment and ingredients as shown in Example 1, with the following exceptions, a bulk polymerized polyvinyl chloride homopolymer was made by the process of this invention. Ten pounds of vinyl chloride were added to the reactor at a temperature of 20° C together with 0.5 milliliters of 2-methyl pentanoyl peroxide, 2.2 milliliters of "Lupersol 223M", 1 milliliter of odorless mineral spirits, 1 milliliter of expoxidized soybean oil, 5.2 milliliters of octyl phenoxy polyethoxy ethanol sold under the trademark "Triton X-100" by the Rohm & Haas Co., Philadelphia, Pa., 9 grams of a fumed silica and 2.45 grams of water. After a reaction time of 15 minutes at 167 psig, the mixture was transferred to the second stage reactor. Then, 5 pounds of vinyl chloride was added together with 1.26 grams of dicyclohexyl peroxydicarbonate and 5.5 grams of lauroyl peroxide. The mixture was polymerized for 4 hours at a pressure of 97 pounds per square inch gauge. Then, 10 pounds of vinyl chloride was added and the pressure increased to 175 pounds per square inch gauge. After polymerization for 3 hours, there was obtained a vinyl chloride polymer in 86% yield. The reactor and the stirring mechanism showed scale in the amount of 2.1% of total conversion. 6.5% of the product was oversize, that is, had a particle size which does not permit the resin to pass through a 70 mesh screen.

EXAMPLE 4

Using the same procedure and proportions as shown in Example 3, except that 7.4 grams of water were used, there was obtained a resin in 80 percent yield of which 1.25% was scale and 2.75% was oversize resin particles.

EXAMPLE 5

(Control)

Using the same procedure and proportions of ingredients of Example 3, except that no water is used, the polymer obtained in 80% yield showed 3.0% scale and 12.0% oversize resin particles out of a total conversion of 13 pounds of resin.

EXAMPLE 6

Following the same procedure and using the same proportions as shown in Example 3, with the exception that 4.9 grams of water was used in the formulations, a vinyl chloride polymer was obtained in 83% yield out of which 0.97% of the product was scale, contained on the inside wall of the reactor and on the stirring mechanism and 7.73% of the resin was oversize.

EXAMPLE 7

Using the same procedure, equipment and ingredients as shown in Example 1, except as noted below, a vinyl chloride polymer was made by the process of this invention. The first stage reactor was charged with 4.9 grams of water, in addition to the ingredients as shown in Example 1 and the mixture polymerized. Prior to polymerization in the second stage 5-gallon reactor, 91 grams of an ethylene-propylene rubber sold under the trademark "Epsyn 3006" was added to the mixture. The powdery polymer obtained in a yield of 85.8 percent contained 0.69 percent scale and 15.06 percent of the product was oversize, i.e., would not pass through a 70 mesh screen.

The invention has been described in the above specification and illustrated by reference to the specific embodiments in the above examples. In the above Examples 3, 4, 6 and 7 which illustrate the invention, the amount of water used based on the amount of inert fine particle additive employed ranges from about 27 to about 83 weight percent based on the weight of the said inert fine particle additive. It is, however, to be understood that these embodiments are not intended to limit the invention, since changes and modifications in the specific details disclosed hereinabove can be made without departing from the spirit or scope of the invention disclosed herein.

What is claimed is:

1. In the process for the preparation of a vinyl halide polymer by bulk liquid phase polymerization carried out in the presence of an initiating amount of a free radical initiator for vinyl halide polymerization, the improvement comprising the steps of:
   1. admixing a vinyl halide monomer composition with about 0.02 to about 0.3% water by weight based upon total monomer, and an organic or inorganic inert fine particle size material which is solid at least at reaction temperatures, is insoluble in said monomer, and consists essentially of particles having an average particle size in the range of about 0.001 to about 50 microns, the amount of water employed being about 27 to about 83 percent by weight of the inert fine particle size additive;
   2. polymerization in a first stage using high speed agitation at a temperature of from about 30° to about 80° C. until about 3% to about 20% by weight of said monomer composition has been converted to polymer particles and
   3. continuing said polymerization in a second stage during which the reaction mixture is subjected to low speed agitation until at least about 30% by weight of the reaction mixture has been converted to polymer comprising said inert fine particle size material.

2. The process of claim 1 wherein said water is added in said first stage, said second stage, or in both said stages.

3. In the process for the preparation of small particle size polymer of vinyl halide by bulk liquid phase polymerization carried out in the presence of an initiating amount of a free radical initiator for vinyl halide polymerization the improvement which comprises the steps of:
   1. polymerization of a vinyl halide monomer composition in a first stage using high speed agitation at a temperature of from about 30 to about 70 degrees centigrade in contact with about 0.02 to about 3% water by weight based upon total monomer and at least one of:
      a. an additive of an inorganic or organic, inert fine particle size material which is solid at least at reaction temperature, is insoluble in said monomer, and consists essentially of particles having an average particle size in the range of about 0.001 to about 50 microns said material being present in the amount of 0.001 to 5% based upon said monomer composition in said first stage, so that the amount of water employed therein is about 27 to about 83 percent by weight of the weight of the inert fine particle size additive, and
      b. said additive and a surface active agent in an amount of 0.01 to 5% by weight based upon said monomer present in said first stage; until about 3% to about 20% by weight of said monomer composition has been converted to polymer particles,
   2. continuing the preparation of small particle size polymers by polymerization in a second stage during which the reaction mixture is subjected to low speed agitation until about 30 to about 80% by weight of the reaction mixture has been converted to base polymer,
   3. introducing additional monomer into said second stage comprising at least one vinyl halide monomer or at least one co-monomer which co-polymerizes therewith or mixtures thereof and
   4. carrying out the subsequent polymerization in said second stage to provide non-porous polymer particles comprising said fine particle size inert material by increasing the second stage polymerization temperature after about 30 to about 80% by weight of said reaction mixture has been converted to polymer, from a range of about 30° to about 70° centigrade to a range of about 60° to 80° centigrade, said increase in polymerization temperature being about 10° to about 50° centigrade.

4. The process of claim 3 wherein 1 to 200% by weight of said additional monomer based upon the weight of the resultant converted base polymer or copolymer is added all at once.

5. The process of claim 4 wherein the monomer composition polymerized in said first stage is vinyl chloride and the monomer added in said second stage is vinyl chloride.

6. The process of claim 5 wherein a polyolefin is present in the proportion of about 0.05 to about 2.5 percent by weight based upon said vinyl halide monomer or monomers.

7. The process of claim 5 wherein said additive consists of a fumed silica.

8. The process of claim 5 wherein said surface active agent is octyl phenoxy polyethoxyethanol.

9. In a process for the preparation of a polymer of vinyl halide by bulk liquid phase polymerization comprising the steps of:
1. polymerization of a vinyl halide monomer in a first stage with high speed agitation at a temperature of from about 30° to about 80° centigrade until about 3% to about 20% by weight of said monomer has been converted to polymer, and
2. continuing the preparation of said polymer in said second stage with low speed agitation until about 30 to about 95% by weight of said reaction mixture has been converted to polymer and then introducing at least one comonomer copolymerizable therewith in the presence of said polymers; the improvement which comprises conducting said polymerization in contact with at least one of
   a. water and an additive of an organic or inorganic inert fine particle size material which is solid at least at reaction temperature, is insoluble in said monomer; and consists essentially of particles having an average particle size in the range of about 0.001 to about 50 microns,
   b. water, said additive, and a polyolefin; or
   c. water, said additive, a surface active agent and a polyolefin, the amount of water employed in each of (a), (b) and (c) being about 27 to about 83 percent by weight of the inert fine particle size additive.

10. The process of claim 9 wherein said polyolefin is present in the proportion of about 0.05 to about 2.5% by weight based upon said vinyl halide monomer.

11. The process of claim 9 wherein the monomer composition polymerized in the first stage is vinyl chloride and the co-monomer added in said second stage is an acrylate monomer or mixtures thereof, the homopolymers of which have a glass transition temperature of 10° C or below.

12. A process for the preparation of a vinyl halide polymer comprising bulk polymerizing in liquid phase a first component comprising at least one vinyl halide monomer and at least one ethylenically unsaturated comonomer copolymerizable therewith in contact with (1) a second component comprising a polyolefin and an additive of an organic or inorganic inert fine particle size material which is solid at least at reaction temperature, which is insoluble in said monomer and which consists essentially of particles having an average particle size in the range of about 0.001 to about 50 microns and water, or water and said additive, wherein said water is present in the amount of about 0.02 to about 0.3% by weight based on said monomer and of about 27 to about 83 percent by weight of the inert fine particle size additive, and (2) a vinyl halide based polymer seed in powder form produced by bulk, suspension or emulsion polymerization processess.

13. The process of claim 12 wherein said polyolefin is present in a proportion of about 0.05 to about 2.5% by weight based upon said vinyl halide monomer or monomers.

14. The process of claim 12 wherein said vinyl halide monomer is vinyl chloride and said comonomer is an acrylate monomer or mixtures thereof, the homopolymers of which have a glass transition temperature of 10° C or below.

* * * * *